United States Patent [19]
Drummond et al.

[11] 3,718,448
[45] Feb. 27, 1973

[54] GLASS FIBER FORMING AND COATING PROCESS

[75] Inventors: Warren W. Drummond, Allison Park; Donald W. Denniston, Pittsburgh, both of Pa.

[73] Assignee: PPG Industries, Inc., Pittsburgh, Pa.

[22] Filed: Jan. 3, 1972

[21] Appl. No.: 214,748

Related U.S. Application Data

[63] Continuation-in-part of Ser. No. 80,219, Oct. 12, 1970, abandoned, which is a continuation of Ser. No. 814,731, April 9, 1969, abandoned, which is a continuation-in-part of Ser. No. 742,743, July 5, 1968, abandoned.

[52] U.S. Cl.................65/3, 65/11 W, 117/126 GB, 118/69
[51] Int. Cl..............................................C03c 25/02
[58] Field of Search........65/2, 3, 11 W; 117/126 GB; 118/65, 67, 69

[56] References Cited

UNITED STATES PATENTS

| | | |
|---|---|---|
| 3,158,519 | 11/1964 | Shannon et al.................117/126 GB |
| 3,425,862 | 2/1969 | Eakins....................................65/3 X |
| 3,428,518 | 2/1969 | Schafer..........................117/126 GB |
| 3,494,753 | 2/1970 | Sears...........................................65/3 |
| 3,619,252 | 11/1971 | Roschler...............................65/3 X |
| 3,620,701 | 11/1971 | Janetos et al..............................65/3 |

Primary Examiner—Robert L. Lindsay, Jr.
Attorney—Russell A. Eberly

[57] ABSTRACT

Simultaneously forming a large number of continuous filament glass fibers from a single bushing, coating the individual glass fibers with an aqueous liquid coating material, combining the fibers into a plurality of strands and drying the coating on the fibers while the strands are spaced from each other. In the strand forming process, the individual coated glass fibers are brought together and held together in small, spaced groups of fibers and the small groups of the coated fibers are dried while in this spaced relation before they are collected on the forming tube.

10 Claims, 3 Drawing Figures

GLASS FIBER FORMING AND COATING PROCESS

CROSS REFERENCE TO RELATED APPLICATIONS

This is a continuation-in-part of application Ser. No. 80,219, filed Oct. 12, 1970, now abandoned, which is a streamlined continuation of application Ser. No. 814,731, filed Apr. 9, 1969, now abandoned which is a continuation-in-part of Ser. No. 742,743, filed July 5, 1968, now abandoned.

FIELD OF THE INVENTION

The present invention relates to a method of coating fibers and it has particular relation to coating glass fibers during their formation into a strand which is to be used as a reinforcement for resinous and elastomeric products.

DESCRIPTION OF THE PRIOR ART

A glass fiber strand is composed of a multitude of fine glass filaments which are formed by being drawn at a high rate of speed from molten cones of glass located at the tips of small orifices in a bushing such as shown in U. S. Pat. No. 2,133,238. During formation, the filaments are coated while moving at a speed in excess of 5,000 up to 20,000 feet per minute with a size which contains a binder to give the strand integrity for workability for any standard textile or reinforcement use. If the strand does not have proper integrity, fuzzing occurs during these operations and eventually the strand breaks. The size also contains a lubricant for the filaments to prevent destruction of the strand by abrasion of the individual filaments against each other or against fiber handling equipment.

It is common practice to use glass fiber strands and glass fiber cloth as a reinforcement for resins. For such use, the glass fibers are coated with a coupling agent or finish material which makes the surface of the glass fibers substantive and compatible with the particular resins with which they are to be employed. These coupling agents greatly increase the dry and wet physical strengths of the glass fiber resin laminate.

When the glass fibers are used in the form of strand, i.e., roving or chopped strand or twisted strand, for resin reinforcement, the coupling agent is usually combined with the size and applied with the size to the fibers during their formation. The size employed is usually an aqueous dispersion of a film forming, synthetic binder, and a glass fiber lubricant.

Roving is formed by combining a number of strands in parallel form and winding the strands on a tubular support in a manner such that the combined strands may be unwound and used to form woven roving or chopped strands. Twisted strand (single end on a bobbin) is made according to conventional textile twisting techniques by removing the strand from the forming package and winding it on a twister bobbin. It is therefore necessary that the strand have good integrity and resistance to fuzzing during the steps employed to make the twisted strand or roving and fabricate them into forms suitable for use as a resin reinforcement.

It is desired that a treatment be provided for glass fiber strand which will render the strand capable of providing increased strength to glass fiber reinforced resinous and elastomeric products. For example, it is desired that a strand be provided which is equally useful as a reinforcement for styrenated polyester resins, epoxy resins, thermoplastic resins, natural rubber and synthetic rubbery polymers. In this regard it is desired to produce a strand which is composed of a plurality of smaller or fine strands which are easily wet-out with resin or coated or impregnated with a rubber adhesive coating.

It is an object of this invention to provide an elastomer (rubber) coated glass fiber strand, yarn, roving or textile fabric for reinforcement of elastomers (rubber). The elastomer (rubber) coated glass fiber reinforcement should adhere well to the elastomer matrix at high and low temperatures and should have long life and good strength under severe flexing conditions.

The term "elastomer" as used herein and in the claims is intended to include elastic substances such as natural latex from the Hevea tree and synthetic rubber and rubber-like materials. It also includes natural and synthetic rubber and rubber-like materials which have been chemically modified such as by chlorination to improve their physical properties. Synthetic rubber includes rubber-like materials such as chloroprene, butadiene, isoprene and copolymers thereof with acrylonitrile, styrene and isobutylene. The term "elastomer" includes natural and synthetic rubber in the uncured or unvulcanized state as well as in the cured or vulcanized state.

It has long been recognized that glass fiber cord should make an ideal reinforcement for timing belts (U. S. Pat. No. 2,135,057) and automobile tires (U. S. Pat. No. 2,184,326). These uses have been slow in development because of the difficulty of coating and impregnating the glass yarns with an adhesive which is necessary to give proper adhesion between the glass fibers and rubber. Also, the tensile strength and compression fatigue resistance of the glass fiber cord has not been satisfactory because the individual fibers were not protected from destruction by mutual abrasion.

Coating and impregnating of glass fiber strands, yarn and roving with a rubber adhesive has now been developed technically to the point where glass fiber reinforced timing belts and rubber tires are established commercial products. The coating and impregnating of the strand, yarn or roving is done in a separate step at a slow speed, i.e., 150 to 300 feet per minute, in order to ensure complete impregnation of the rubber adhesive material. It is presently desired to provide a more economic process for coating and impregnating glass fiber strand with a rubber adhesive to provide an improved rubber reinforcement and thereby enhance the acceptance of glass fibers as a rubber reinforcement.

SUMMARY OF THE INVENTION

According to the present invention a coated glass fiber strand is produced by drawing a plurality of individual glass fibers from a bushing, applying an aqueous coating to the individual fibers while they are separated from each other and then heating the coated fibers to dry them. The heating can be sufficient to partially or fully cure any curable ingredients in the coating on the fibers prior to gathering them into a strand. The fibers are coated by means of a conventional roller applicator and they tend to join into small, spaced groups of fibers at the applicator due to the surface tension of the coating liquid. These small, spaced groups of fibers pass through a suitable heating zone, i.e., an oven, and are dried while in this spaced relation. They may then be combined into a strand at a station beyond the heating zone by means of a conventional strand grouping guide and wound on a forming tube. The strand may be further heated to cure the coating before it is wound on the forming tube. If desired, the fibers may also be separated mechanically into the spaced groups of fibers prior to heating by using a mechanical separator conventional in the art.

The strand (roving) as thus formed is composed of a plurality of sub groups of fibers (fine strands). The fibers in the sub groups are well bonded to each other throughout their length, whereas the sub groups are only weakly bonded to each other throughout their length so as to permit separation of the fine strands from each other upon chopping or impregnation with a resin or rubber adhesive.

The speed of fiber travel during formation of the glass fibers and subsequent coating and drying is substantially faster than coating speeds now employed for coating strands and yarn in a secondary coating operation. This is possible because the removal of moisture from the aqueous coating can be accomplished at a much faster rate by heating the sized glass fibers while they are spaced from each other in small spaced groups of fibers. These spaced groups provide much more surface area for drying than when the fibers are all grouped together in one large strand. The accomplishment of the coating, drying, and curing integral with the strand forming is economical because it is technically desirable to form a large number of filaments, i.e., 1,200 to 6,000 or more, from a single bushing at drawing speeds somewhat lower than the speeds of 12,000 to 20,000 ft./min. which are employed when only 204 or 408 fibers are being formed from a single bushing. For example, forming speeds as low as 500 up to 5,000 feet per minute are employed in forming 1,500 and more fibers per bushing.

BRIEF DESCRIPTION OF THE DRAWINGS

These and other advantages of the invention and their means of accomplishment are further described in conjunction with a description of the drawings in which:

In FIG. 1 of the drawing, there is shown a fiber forming and coating apparatus composed of a bushing 10 connected to a premelter 12 which is automatically fed with glass marbles from a supply hopper 14 in conventional manner. Alternatively, the bushing can be connected to the forehearth of a glass melting tank in the conventional manner. A plurality of glass fibers 16 are drawn from cones of glass suspended from tips in the bottom of the bushing. The number of fibers can be 800 to 6,000 or more. For example, 1,000 fibers can be drawn from tips in the bushing which are arranged in 40 pairs of rows having 25 tips in each pair of rows. This arrangement provides 40 groups 24 of fibers which form into 40 separate groups which pass through the drying oven, each group having 25 fibers.

Figure 1:
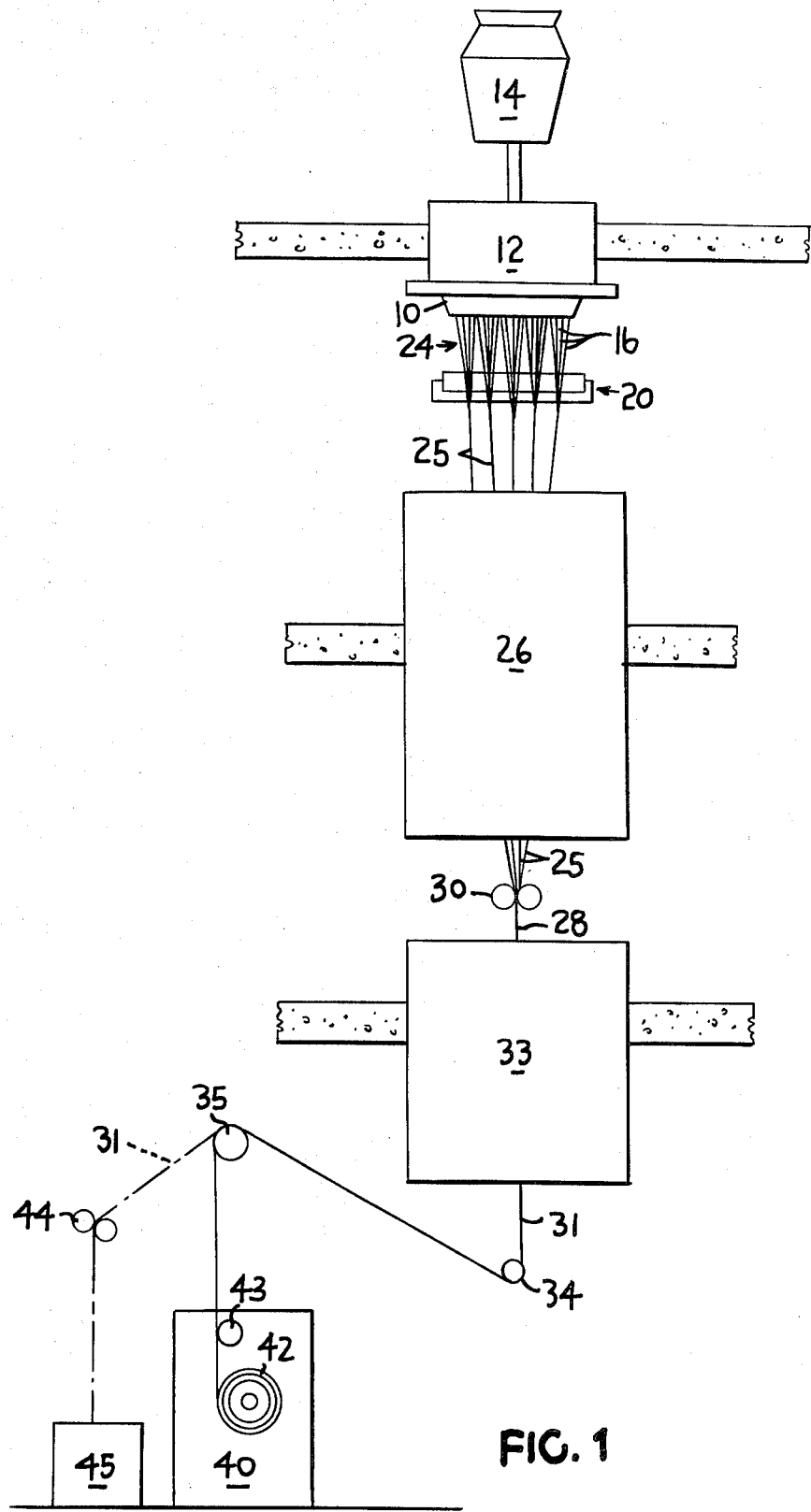
FIG. 1 is a diagrammatic elevation of a glass fiber strand forming and coating operation.

The individual fibers pass over a rotating roller in a conventional roller coating applicator 20 such as described in U. S. Pat. No. 2,873,718. An aqueous roving size or an aqueous rubber adhesive dip such as described in U. S. Pat. Nos. 2,691,614; 2,817,616 and 2,822,311 is applied to the individual fibers as they pass over the rotating roller.

The surface tension of the coating brings the fibers together into spaced apart groups at the applicator. Mechanical separators can be used for this purpose if desired, though it is often not necessary. The groups 24 of coated fibers then proceed downwardly through a dielectric oven 26 in a first heating zone which heats the coated fibers to remove the water from the coating. The groups 24 of fibers are spaced about one-half inch from each other as they enter the oven 26 and they gradually come closer to each other as they pass through the oven. The length of the oven 26 is such that sufficient heat is applied to remove the water from the coating. For example, with groups 24 containing about 25 fibers each and traveling at about 2,000 feet per minute, a dielectric oven 15 feet in length designed to provide 10 kilovolt amperes is suitable. In place of dielectric oven 26, an oven utilizing hot gases or an infra-red radiant heating source can be used to dry the groups 24. Such heat treatment usually serves to partially cure any curable ingredients in the coating. The glass fibers in each group 24 are bonded together throughout their length so as to form a plurality of strands 25.

The strands 25 of coated fibers are joined together into a strand 28 as they pass over a pair of graphite gathering shoes 30. Thereafter, the composite strand 28 passes through another heating zone wherein additional heat is applied to the coated fibers to further cure the coating and bond the strands 25 to each throughout their length to form roving 31. The strands 25 may or may not be bonded to each other in the roving to a lesser degree than the fibers are bonded to each other in each strand 25 depending upon the degree of heating after strands 25 are joined together, as well as upon the amount and type of size or dip that is applied to the individual fibers.

The heat in the second heating zone can be applied in a similar manner to that applied in the first zone, i.e., by means of a dielectric oven 33 or a hot gas or radiant oven. The first and second heating zones mentioned above can just be two separate zones in a single oven. The dividing point in the oven is that point wherein the groups 24 of fibers join into strand 28.

After leaving the second heating zone, the coated strand passes over suitable guides 34 and 35 to a glass fiber strand forming winder 40 such as illustrated in U. S. Pat. Nos. 3,041,662; 3,151,963 and 3,256,079. The forming winder is run at a relatively slow speed, i.e., at about 500 up to 5,000 feet per minute. A cylindrical package 42 with an open wind is produced by means of a suitable conventional traverse 43. Alternately, the strands 25 of fibers 16 can be joined into a roving 31 after passing through a single oven and before being wound on a forming package or chopped into short discontinuous strands.

As shown in FIG. 1 of the drawing, the fiber forming apparatus is located on a plurality of factory levels. The bushing 10 and glass supply are located on a third level and the oven 26 extends from the third level through to the second level on which the shoe 30 is located. The oven 32 extends from the second level to the first level on which the winder 40 is located. It is preferred that the strand be pulled continuously during changing of packages on the winder in order to avoid rethreading the strands 25 and roving 31 through the ovens between packages. Thus, pulling wheels 44 located to one side of the winder are used for this purpose to direct the roving 31 into a waste container 45. The strand travel direction can be changed to horizontal prior to entry into the second heating zone in order to reduce the height of the factory facility.

Figure 2:
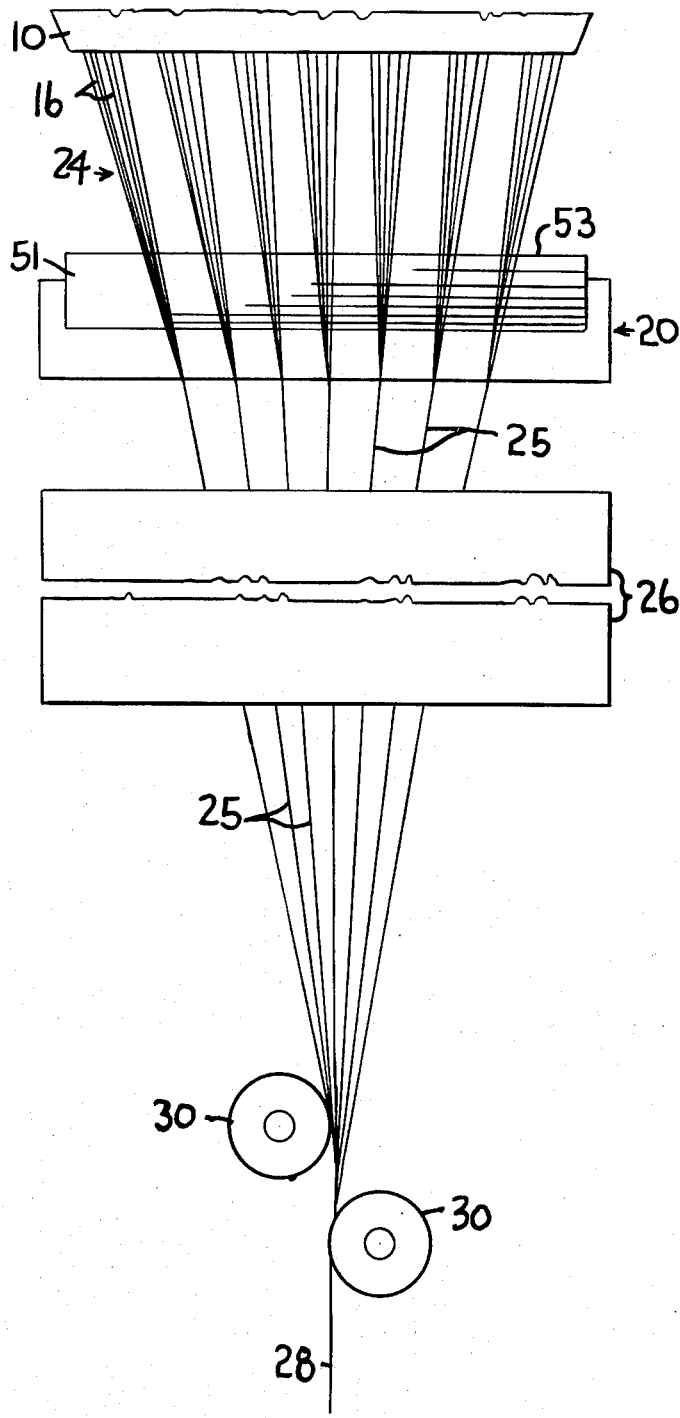
FIG. 2 is an enlarged view of a portion of the operation shown in FIG. 1.
Figure 3:
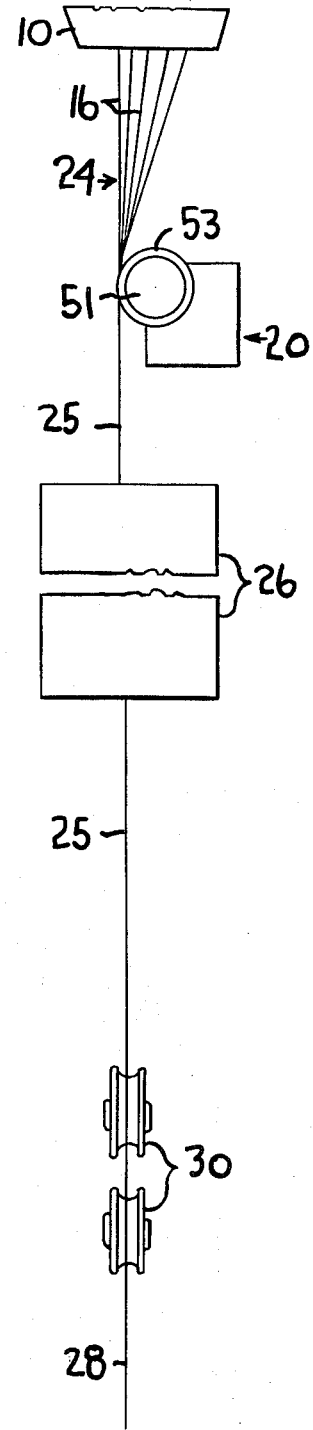
FIG. 3 is a side view of FIG. 2 illustrating the arrangement of the glass fibers as they pass through a portion of the forming and coating operation.

In FIGS. 2 and 3, a portion of the coating apparatus is shown in diagrammatic form on an enlarged basis. The individual fibers 16 are formed in small inverted pyramid shaped groups 24 containing, for example, 10 to 50 fibers in each group. These fibers first contact the roller 51 in a slightly spaced side by side relation. As they move over the surface of the roller 51 they tend to first move together in a ribbon and then to fold over on each other as they leave the surface of the coated roller. The layer of coating 53 which is picked up by the fibers 16 from the roller then tends by surface tension to hold fibers 16 together in a unitary group which tends to be round or oval shaped in cross-section. These groups 24 present a much greater surface area for drying of the coated glass fibers than if they were consolidated into the composite strand 28 before drying. Hence the drying rate is much faster and the coating of the strand can proceed at a much faster rate in a much smaller oven.

DESCRIPTION OF THE PREFERRED EMBODIMENTS

The advantages of the invention are further explained in the following examples:

For Elastomer Reinforcement

EXAMPLE I

Utilizing the apparatus illustrated in the drawings, 1000 "E" glass fibers each 0.00035 to 0.00040 in diameter, are drawn from the bushing and coated with the following coating:

| Ingredients | Parts By Weight |
|---|---|
| Resorcinol | 340 |
| $CH_2O$ (37% aqueous solution) | 500 |
| NaOH | 4.65 |
| Butadiene - Styrene - Vinyl pyridine terpolymer latex (Gen-Tac-41% solids dispersed in water) | 7565 |
| $NH_4OH$ (28% $NH_3$ in $H_2O$) | 350 |
| Deionized water | 6725 |
| Gamma, Aminopropyltriethoxysilane (7% aqueous solution) | 535 |
| Solids Content (non aqueous) by weight | 23.4% |

The glass fibers move across the roller applicator at a speed of 2,000 feet per minute so as to pick up 50 percent by weight of coating material on each group 24 of fibers based upon the weight of the fibers. The groups of fibers contain about 25 fibers per group.

The coated groups pass through a dielectric oven such as described in pending application, U. S. Ser. No. 605,814 filed Dec. 29, 1966 and assigned to applicant's assignee. The water and $NH_3$ ingredients of the coating are removed in the oven 26. The coated groups 24 are joined into a strand and the strand passes through oven 33 during which time the curable ingredients, i.e., resorcinol and formaldehyde, are heated to a temperature of about 600° to 800°F. for a period of about ½ to 1 second. The strand containing the cured coating is relatively free from tack and can be wound into a cylindrical open wind forming package and unwound therefrom at a later date for further processing into suitable form for the desired rubber reinforcement. The dried, coated strand contains 10 percent by weight of coating based upon the weight of the strand and coating. Depending upon the concentration of the solids content in the coating, the dried coated strand can contain 5 to 20 percent by weight of coating based upon the weight of the strand and coating.

The coated strands provide satisfactory H adhestion, flexural strength and compression fatigue resistance to glass fiber reinforced elastomer products. Improved rubber reinforcement is achieved when either the cord or fabric produced from the roving prepared according to this invention is overcoated with an additional coating of rubber adhesive. The cord or fabric is readily impregnated by the additional adhesive and improved dynamic strength properties are thereby obtained.

The process of the present invention is especially useful in the production of roving for resin reinforcement. Conventional roving sizes such as described in U. S. Pat. Nos. 3,168,389; 3,284,179; 3,249,411 and 3,249,412 are applied to the fibers 16 and the fibers form into the groups 24 upon leaving the roller 51 of the size applicator 20. The fibers in the groups 24 are dried and bound together in the strands 25 which are subsequently brought together at the guides 30. The ultimate or composite strand 28 is then wound on the forming package and baked thereon according to conventional schedules, i.e., usually about 250°–280°F. for 8 to 10 hours.

For Resin Reinforcement

EXAMPLE II

Utilizing the apparatus illustrated in the drawings, 1,000 E glass fibers each 0.00035 to 0.00040 in diameter are drawn from the bushing and coated with the following roving size:

| Ingredients | Parts By Weight |
|---|---|
| Dow Epoxy Resin 331 | 100 |
| Xylene | 10 |
| Pluronic F–108 | 5 |
| Geigy Amine O | 5 |
| Polyvinyl Pyrrolidone | 20 |
| Acetic Acid | 5 |
| Pelargonic acid amide solubilized in water with acetic acid | 5 |
| Gamma-amine-propyl triethoxy silane | 10 |
| Water | Sufficient to total 2,000 parts |

The preparation of this size is described in greater detail in Example VI of the above-mentioned U. S. Pat. No. 3,249,412. In one form of the invention the forming package is baked at 280°F. for 8 hours. In another form of the invention, the forming package is not baked prior to use of the roving. This depends upon whether or not it is desired to have the strands bonded to each other throughout their length in the roving.

The roving 31 which is unwound from the baked forming package has sufficient integrity to permit its handling as a single composite strand 28 or roving 31 without breaking down into the smaller strands 25; however, it does not have sufficient integrity to prevent the strands 25 from separating into separate fine strands when the roving 31 is chopped into short lengths or when the roving 31 is wet-out and impregnated with a resin either during filament winding or the combination of strand reinforcing mat with a viscous thermoplastic or thermosetting resin. The break-up of the roving 31 into fine strands 25 prior to or when combined with the resin provides better wet-out of the resin with the resultant production of glass fiber reinforced resinous products of improved strength.

It may be desired to have no adherence between the strands if there is any tendency for catenary problems and "bird nesting" when barrel shaped forming packages or roving packages are being unwound from the center of the package. This is accomplished by using a reduced amount of coating on the fibers and/or holding strands and not bringing them together until after the heating step in oven 33. Elimination of substantial reduction of the baking of the forming package also aids in production of strands in the roving 31 which are not bound together.

The process of the invention has increased flexibility as far as application of sizing materials is concerned. The drying of the strands prior to being grouped into roving 31 and wound on the forming tube reduces the amount of size that is wasted. In the conventional process, the wet size is thrown or stripped off of the strand, (1) as the strand passes over the fiber gathering guide, (2) as the strand passes over the rapidly rotating traverse, (3) as the strand oscillates rapidly during its travel from the guide to the traverse and (4) by centrifugal force as the strand is collected in the forming package. This also permits application of less size at the applicator in order to get the desired amount of size on the fibers. On the other hand, with the increased drying capacity in the present method, higher solids content of size can be applied and retained on the fibers where this is desired. Thus the present process provides flexibility for applying smaller or larger quantities of size to the fibers during forming.

Another important advantage of the present invention is that it substantially reduces or eliminates any tendency of migration of the size ingredients on the forming package. "Size migration" occurs in a forming package when it is dried to reduce the moisture content in the package and, if necessary, to cure the resin binder in the size and/or affix the coupling agent in the size to the glass fibers. The drying of the strand or roving prior to winding it on the forming tube removes the moisture which heretofore carried the size ingredients with it during its passage to the outside of the package and thereby obviates the problem of size migration. This advantage is also applicable to forming packages from which strand for textile purposes is withdrawn for twisting, plying and weaving where "size migration" has been a serious problem. See U. S. Pat. Nos. 3,227,192 and 3,265,516.

It can be seen from the above description of advantages that the present invention permits the production directly from the bushing of roving (a plurality of strands joined in parallel relation) made up of a large number of fine strands without the extra costs of handling individual strand forming packages. The fine strands are especially desirable for reinforced resin products since they do not tend to protrude from the surface of the product such as conventional strands made from 204 filaments. The present process and product are an improvement over the process and product described and claimed respectively in U. S. Pat. Nos. 3,056,711 and 3,276,945. In the patented process the strand is split into two strands by two guides before it is wound on the forming tube. The two strands are stated to be bound to each other only intermittently throughout their length as a result of their crossing over each other during traversing of the strand along the package. The patents suggest that the strand can be split up into more than two strands, however, this requires a great many guides which are difficult to thread individually. In addition, the large number of guides would present a space and maintenance problem. The process of the present invention provides self-threading and improved integrity of the roving for handling as well as a greater number of finer strands in a single roving and is thus a distinct improvement over the patented process and product.

A further advantage of the reduced amount of handling which is made possible by the present invention is that the invention permits the use of new sizes which do not require lubricants. This permits new roving sizes to be formulated without concern about the chemical and physical effects of the binders and lubricant on each other. Thus, simpler roving sizes and a greater variety of roving sizes can be employed.

The present process permits the formation of fine chopped strands and fine chopped strand mat directly from the bushing in an economical manner. The roving 31 instead of being wound on a forming package as shown in the drawings, is fed directly to a conventional chopper such as shown in U. S. Pat. No. 2,719,336. The roving 31 breaks up into fine strands 25 upon being chopped and they are collected as such or in mat form for sale to manufacturers of glass fiber-reinforced resin products. In an alternate manner, the dried strands 25 are not combined into roving but are fed into the chopper in spaced relation and collected as chopped strands or as chopped strand mat.

Rather than being fed to a chopper, the dried strands 25 in spaced relation or combined as roving 31 can be fed directly to a foraminous collection chain by apparatus such as shown in U. S. Pat. No. 3,293,013 to form continuous strand mat for resin reinforcement. The strands 25 in the roving can be adhered together throughout their length or can be free of adhesion from each other throughout their length as desired. This is accomplished by using more or less coating on the fibers, the lesser amount of coating being used when no adherence between the strands is desired.

The present process can be employed in the manufacture of filament wound reinforced resin products directly from the bushing. The dried strands 25 in spaced relation or combined as roving 31, instead of being wound on a forming package, are fed through a bath of A stage polyester or epoxy resin, then wound on a rotating cylindrical mandrel and cured thereon in a conventional manner to form a filament wound pipe or storage cylinder. The catenary problem that is troublesome in filament winding processes is avoided when the roving is drawn directly from the bushing, sized, dried, impregnated with a curable resin and wound on the rotating mandrel.

The invention has been described with respect to details of a best mode of operation contemplated by the inventors. Other embodiments are contemplated which should be obvious in the light of the description. The coating can be applied in two stages by two different roller applicators. In the first stage an amino silane coupling agent can be applied and the remainder of the coating can be applied by a second applicator. Both applications are to the individual fibers 16 prior to them being passed through oven 26. Intense local heat can be applied to the fibers coated with the amino silane prior to them being coated with the rubber adhesive to fix the silane on the fibers and provide better adhesion of the glass fibers to the resin. The two stage application as described is also desirable if there is any tendency for the silane coupling agent to throw the latex out of the dispersion in the adhesive coating. Various coupling agents and adhesive coatings can be applied to glass fibers according to the invention.

The various details set forth above in the description of the invention are not to be considered as limitations upon the scope of the invention except insofar as set forth in the accompanying claims.

We claim:

1. A method of forming glass fibers which comprises pulling glass fibers from molten glass passing through orifices in a bushing, applying a liquid coating of a material selected from the group consisting of heat curable elastomers and heat curable resins to the fibers as they are being pulled in a quantity sufficient to render them useful as reinforcement for elastomers or resins, bringing the coated fibers together until said coating material causes said fibers to adhere to each other and provide a plurality of spaced apart fine fiber strands, passing the spaced apart, fine fiber strands through a drying zone in which they are dried and said coating material is at least partially cured, forming the fine, spaced apart fiber strands into a grouped strand, heating the grouped strand in a second heating zone to further cure said coating material thereon and recovering said grouped strand.

2. A method of forming glass fibers suitable for use in reinforcing elastomers or resins, comprising pulling glass fibers from molten glass through orifices in a bushing, applying an aqueous coating of a material selected from the group consisting of heat curable elastomers and heat curable resins to the fibers while they are separated from each other and are being pulled, bringing the coated fibers together until said coating material causes said fibers to adhere to each other and provide a plurality of spaced apart fiber strands, removing at least a portion of the moisture from the fiber strands while the strands are spaced from each other and drying or at least partially curing said coating by passing the spaced apart strands through an oven, and grouping the fine fiber strands together after drying or partially curing them.

3. The method of claim 2 wherein the coating on the grouped strand is 5 to 20 percent by weight.

4. A method of forming an article composed of a group of fiber glass strands coated with an at least partially cured coating of a material selected from the group consisting of heat curable elastomers and heat curable resins comprising withdrawing a plurality of glass fibers from a mass of molten glass, applying pulling forces to the fibers of each of a group of said glass fibers from a location spaced from said mass of molten glass so that the glass fibers of each group converge to form a strand at a location between said mass of molten glass and the location at which said pulling force is exerted, maintaining said strands in spaced relation, applying a coating of a material selected from the group consisting of heat curable elastomers and heat curable resins to said glass fibers before said groups of glass fibers converge until said coating material causes said fibers to adhere to each other and form strands, heating said coated strands while said strands are maintained in spaced relation to dry or at least partially cure said coating, moving a group of said strands along converging paths until said strands are in surface-to-surface contact so as to form a group of fiber glass strands coated with an at least partially cured coating of a said coating material and recovering said group of fiber glass strands.

5. A product produced according to the method of claim 2.

6. The method of claim 1 wherein the drying zones are in a single oven.

7. The method of claim 1 wherein two distinct ovens are used, one for each drying zone.

8. The method of claim 2 wherein the drying zone is a dielectric oven.

9. The method of claim 7 wherein the ovens are dielectric ovens.

10. The method of claim 5 wherein the coating in the grouped strand is between 5 to 20 percent by weight of the finished strand.

* * * * *